June 18, 1963  A. L. BAKER  3,093,904
TANGENT SCREW
Filed April 24, 1959
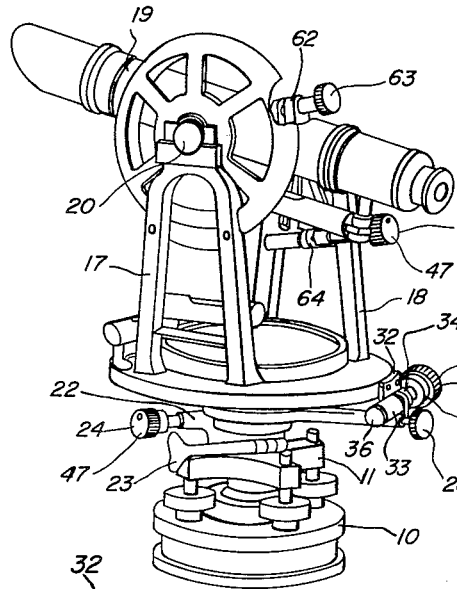
FIG. 1
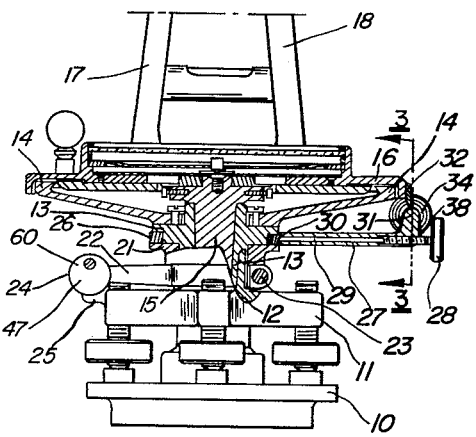
FIG. 2
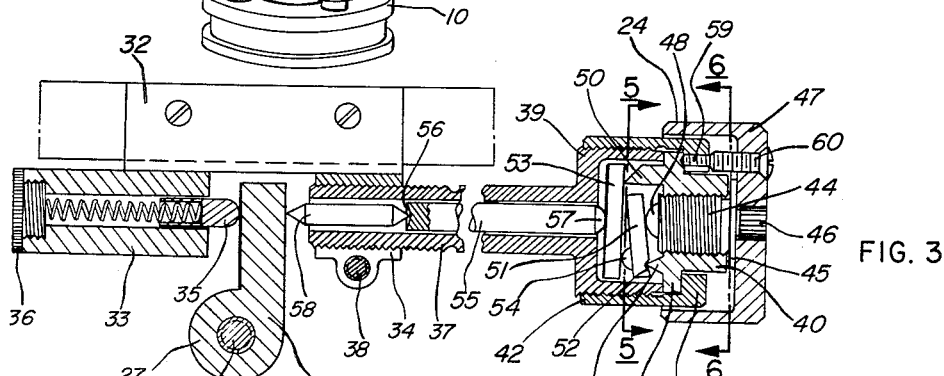
FIG. 3
FIG. 4
FIG. 5
FIG. 6
INVENTOR
ALLISTER L. BAKER
BY
ATTORNEY + AGENT

United States Patent Office 3,093,904
Patented June 18, 1963

3,093,904
TANGENT SCREW
Allister L. Baker, Denville, N.J., assignor to Keuffel &
Esser Company, Hoboken, N.J., a corporation of New
Jersey
Filed Apr. 24, 1959, Ser. No. 808,626
14 Claims. (Cl. 33—69)

The present invention relates to adjustment means for fine and coarse adjustments and particularly to adjustment means used in tangent screws in surveying instruments to obtain accurate angular adjustments prior to reading angles on the horizontal and vertical circles.

Heretofore in surveying instruments, tangent screws have been used to obtain appropriate settings or adjustments of the vernier plate and the vernier scale with respect to the horizontal circle adjustments of the inclination of the telescope as read on the vertical circle and also the adjustment of the horizontal circle with respect to the leveling base. Although tangent screws for this type of adjustment have been in common use including differential tangent screws, the operation of such previously known tangent screws particularly for fine adjustment has not been entirely satisfactory because the amount of rotation of the tangent screw could not be controlled by a person using the instrument. Consequently there is a need for easier operation and more accurate control of the tangent screw.

An object of the present invention is to provide a tangent screw which will overcome the difficulties of the prior art and provide for a single knob control of the tangent screw providing accurate adjustment in the region of the final setting.

Another object of the present invention is to provide a single operating knob for a tangent screw which accomplishes both a coarse and fine adjustment without requiring the use of several control knobs.

A further object is to provide a fine and coarse adjustment of general utility for use where a rapid initial adjustment and a slow and accurate final adjustment is required.

A further object is to provide an adjusting screw with a lever system incorporated therein to provide a coarse and fine adjustment from a single operating means.

Other and further objects will be apparent as the description proceeds and upon reference to the accompanying drawing wherein:

FIG. 1 is a perspective view of a surveying instrument showing tangent screws for the lower clamp, the vernier plate clamp and the telescope clamp each employing the inventive concept of the present invention.

FIG. 2 is a fragmentary vertical section taken substantially through the vertical centers of the surveying instrument and the vernier plate clamp and showing the projection which engages the vernier plate tangent screw, and also showing the lower clamp with portions broken away.

FIG. 3 is a vertical section taken substantially on line 3—3 of FIG. 2 through the axis of the vernier plate tangent screw and lever system of the present invention at one limit of the lever system from clockwise movement of the operating knob and showing the spring pressed plunger and the projection from the vernier plate clamp between the tangent screw and the spring pressed plunger.

FIG. 4 is an axial section of a fragment of the tangent screw and lever housing, showing the other limit of the lever system from withdrawal or counterclockwise movement of the tangent screw operating knob.

FIG. 5 is a vertical section taken substantially on line 5—5 of FIG. 3 showing the first lever and the manner in which it is confined between a fulcrum of a second lever and the opposite wall of the lever housing.

FIG. 6 is a section taken substantially on line 6—6 of FIG. 3 transverse to the axis of the tangent screw illustrating the movement of the adjusting knob with respect to the tangent screw and the lever housing.

Briefly the present invention comprises a tangent screw useful where fine and coarse adjustments are desired as in the adjustment between the horizontal circle and the vernier plate of a surveying instrument. A projection from the vernier plate clamp extends between lugs fixed to the vernier plate and thereby to the vernier scale, in one of which lugs a spring pressed plunger is mounted for urging the projection toward the other lug. An exteriorly threaded tubular tangent screw shaft is mounted at one of its ends in a threaded bore in the other lug, said tubular tangent screw having an exteriorly threaded enlarged lever system receiving housing at its outer end. A fulcrum carrying element is mounted by means of an outwardly extending flange thereon abutting the outer end of the housing and fixed in position by an internally threaded coupling sleeve having an inturned flange engaging the flange of the fulcrum carrying member and threaded onto the exterior threads of the lever housing. A first fulcrum at one side of the axis of the tangent screw is engaged by a groove in a first lever, such first lever being confined between a second fulcrum on the other side of the axis and the side of the housing adjacent said first fulcrum. A second lever confined by said housing is positioned in contact with said second fulcrum and with a third fulcrum on said first lever located on the other side of said first lever from said groove and between said first and second fulcrums. A stub shaft threaded into an aligned threaded bore of said fulcrum carrying member has a projection at one end adapted to engage the first lever, an operating knob being secured to the other end of said stub shaft to provide for rotation thereof, the movement of said knob being limited by the engagement of a set screw on the operating knob with a set screw on said coupling sleeve. A rod of less length than said tubular shaft mounted in the bore of said tubular shaft has a rounded end at one end in engagement with said second lever and a conical recess in its opposite end engaging one end of a toggle pin in said shaft extending between the conical recess end of said rod and the projection of the vernier plate clamp arm whereby the spring pressed plunger causes a constant bias of the projection against said toggle pin and rod and thereby with said lever system to provide for movement of said vernier plate clamp in accordance with the rotation of said hollow shaft and said operating knob.

The telescope clamp and the lower clamp are similarly provided with a tangent screw although the tangent screw and the spring pressed plunger may be on lugs on the clamp arm and the projection may be on a fixed portion of the instrument.

Referring more specifically to the drawing, a conventional type of surveying instrument is shown to include a tripod plate 10 on which a leveling head 11 is mounted by means of the usual leveling screws and such leveling head provides a bearing 12 in which the outer center 13 is rotatably mounted, such outer center carrying the usual horizontal circle 14 with azimuth or bearing scales graduated in degrees. An inner center 15 rotatably supports the vernier plate 16 and the usual vernier scale and through standard frames 17, 18 rotatably supports the telescope 19 for movement about a horizontal axis on telescope axle 20. The construction provides for the usual rotation of the instrument about the vertical axis of the inner and outer centers and about the horizontal axis of the telescope axle 20.

A lower center clamp collar 21 fixed to the outer center 13 has a downwardly extending tubular portion around which a lower clamp 22 is adjustably mounted by means of the usual clamp screw 23 which serves to draw the clamp around the tubular portion of collar 21. A tangent screw assembly 24 is mounted on one lug of the projecting arm of the lower clamp, while a spring pressed plunger (not shown) is mounted on the other lug in the usual manner, with a projection 25 of the leveling head extending between the lugs and engaging the tangent screw assembly and spring pressed plunger.

A vernier plate clamp 26 extending around the outer center 13 in a rabbet thereof has an arm 27 extending outwardly from the clamp ring, with a clamp screw 28 threaded in a bore in such arm and pressing against a rod 29 which presses against a gib 30 to obtain clamping action of the vernier plate clamp in any desired position of adjustment with relation to the outer center 13 and the horizontal circle 14 carried thereby to position an upstanding projection 31 on the arm adjacent the periphery of the vernier plate 16.

Mounted on the vernier plate 16 by means of screws or the like is a mounting means 32 having a pair of lugs 33, 34 extending downwardly therefrom and having aligned apertures, the aperture in lug 33 receiving the conventional spring pressed plunger 35 which is urged by the usual spring reacting against a cap screw 36 toward the lug 34 and causing engagement of plunger 35 with the projection 31 on the arm 27 of the vernier plate clamp 26. The aperture of the other lug 34 is internally threaded and receives a tubular tangent screw 37 having external threads at one end.

The second lug 34 is provided with a radial slot from the exterior to the threaded bore, with a screw 38 to adjust the size of the threaded bore to obtain the proper frictional drag on the tangent screw 37.

A cylindrical housing 39 having screw threads on its exterior is provided at the outer end of the tubular tangent screw shaft 37 at the end of which a fulcrum-carrying element 40 having a circular flange 41 is mounted being secured in position by means of a coupling sleeve having an inturned flange 43 engaging the flange 41 of the fulcrum-carrying element and maintaining such element in fixed relation with the outer end of the cylindrical housing 39. The fulcrum-carrying element 40 has a threaded bore in alignment with the bore of said shaft 37 which receives a threaded stub shaft 44 having a limiting flange 45 and a reduced fluted head 46 forces into a bore of a cylindrical cup-shaped operating knob 47, the opposite end of stub shaft 44 having a rounded projection 48.

A first fulcrum knife edge 49 is provided on fulcrum-carrying element 40 at one side of the axis of the bore, and a second fulcrum knife edge 50 of greater height is provided on the other side of the axis, with both fulcrum knife edges extending inwardly from the fulcrum-carrying element toward the threaded end of the tangent screw 37.

A first lever 51 of a size to be received in said cylindrical housing 39 between said fulcrum 50 and the opposite side of the housing is provided with groove 52 receiving the knife edge fulcrum 49, said first lever 51 also contacting the projection 48 on the stub shaft 44.

A second lever 53 of circular disc shape engages the second fulcrum 50 and also engages a third fulcrum 54 on the surface of the lever 51 opposite the groove 52, said third fulcrum 54 being located between said groove and said threaded stub shaft 44 and engageable with the second lever, whereby rotation of the threaded stub shaft 44 by operating knob 47 will cause said first lever 51 to pivot about said first fulcrum 49 causing said third fulcrum 54 to move said second lever 53 about said fulcrum 50 thereby producing movement of the center portion of said second lever toward the threaded end of the tension screw.

A rod 55 slidably mounted in the bore of said hollow tangent screw shaft is provided with a conical recess 56 at one end and a rounded portion 57 at the other end, which engages the center portion of the disc-shaped lever 53.

A toggle pin 58 having conical points at each end is positioned in said hollow shaft, with one conical point in engagement with the conical recess 56 in said rod, and the other conical point engaging the projection 31 of the vernier plate clamp as clearly shown in FIG. 3.

It will be noted that the end of the toggle pin 58 projects beyond the inner end of the hollow tangent screw at all times and in all positions of adjustment of the levers 51 and 53 caused by the rotation of screw 44 operating knob 47 relative to threaded shaft 37.

A set screw 59 is threaded through a threaded opening in the inturned flange 43 of the coupling element to engage a recess in the outwardly extending flange 41 of the fulcrum-carrying element 40 thereby positively retaining the fulcrum-carrying element the levers and the coupling sleeve in assembled relation.

The projection of the knife edges 49 and 50 and the sizes and thicknesses of the levers and flanges is such that the parts always remain in operative relation after assembly, regardless of the position of the threaded stub shaft 44 or the rod 55.

Within the operative range of the tangent screw assembly the spring pressed plunger maintains a constant bias on projection 31, pin 58, and rod 55 and lever 53 to maintain engagement with their fulcrums thereby assuring accurate operation of the lever system.

A set screw 60 threaded through the bottom of knob 47 at approximately the same radial distance as set screw 59 in the flange 43 of the coupling sleeve 42 engages set screw 59 to limit the rotation of the operating knob 47 relative to the tangent screw shaft 37 and the housing 39.

The length of the threaded stub shaft 44 with respect to the body of the fulcrum-carrying element 42 is such that the parts cannot be damaged by rotation of the operating knob in either direction, since the flange 45 limits the axial movement of projection 48 into the housing 39 and consequently there can be no excessive strain on the parts.

To assure that the lever system operates in a range to give accurate movement, and to provide for rotation of the hollow tangent screw shaft, the set screw 60 is mounted in position so that the lever system will be in substantially the position shown in FIG. 4 when the operating knob 47 is rotated counterclockwise to the limit of movement determined by set screws 59 and 60 whereby the lever 51 remains in contact with projection 48 preventing the end of the lever 51 opposite the fulcrum-receiving groove 52 from abutting the body of fulcrum-carrying element 40.

FIG. 6 shows how set screws 59 and 60 cooperate to limit the rotation of the operating knob 47 and screw stub shaft 44 with respect to the cylindrical housing 39.

The tangent screw assembly 34 is used in the usual manner on the surveying instrument, and in normal use, the lower clamp 22 is set in the desired position and clamped about tubular extension of lower clamp collar 21. The telescope is approximately aligned with the target, after which the vernier plate clamp screw 28 is tightened, and the final adjustment of the vernier plate and the telescope with respect to the horizontal circle is obtained by the movement produced by operating knob 47 of the vernier plate tangent screw assembly 24.

The adjustment obtained by the tangent screw assembly of the present invention provides for coarse adjustment in either direction when the set screw 60 is in engagement with set screw 59. Assuming the coarse adjustment has gone slightly beyond the desired setting, the final or fine adjustment is obtained by reverse rotation of the operating knob 47 to operate the lever system 49 to 55 obtain very fine and accurate adjustment. The threads on hollow tangent screw 37 and the thread on stub shaft 44 are shown of identical pitch, while the mechanical advantage of the lever system is approximately six to one and consequently fine and coarse adjustments can be obtained from a single size of thread, thereby reducing machining costs and obtaining additional advantages as described above.

The tension screw 38 provides a means to obtain the proper frictional drag on the tension screw 37 so that there is sufficient friction for retaining the tension screw and the lever housing 39 against rotation while the operating knob 47 is rotated to obtain the desired fine adjustment through the lever system.

It will be evident that the tangent screw assembly of the present invention may be used on the telescope clamp 62 which is adjusted in clamping arrangement about axle 20 by clamping screw 63 and the tangent screw assembly 24 thereof being mounted on a lug on the arm of the clamp and cooperating with a projection 64 on the A-frame 18 of the surveying instrument.

From the above description it will be apparent that an improved adjusting means has been provided by means of a screw with a lever system incorporated therein, and that the tangent screw of the present invention may be applied to existing equipment by merely removing the existing tangent screw and substituting the tangent screw assembly of the present invention.

It will be obvious to those skilled in the art that various changes may be made in the invention without departing from the spirit and scope thereof and therefore the invention is not limited by that which is illustrated in the drawings and described in the specification, but only as indicated in the accompanying claims.

What is claimed is:

1. A tangent screw assembly for producing coarse and fine movements comprising a mounting means having a pair of lugs extending therefrom in spaced relation, said lugs being provided with substantially aligned bores, a spring pressed plunger mounted in one of said bores and normally biased toward the other bore, a movable element positioned between said lugs and engaging said spring pressed plunger, the bore of the other lug being internally threaded, a tubular tangent screw having external threads at one end threaded into the threaded bore of said other lug, said other lug having a radial slot from the exterior to the threaded bore, with means to vary the size of the slot to obtain a selected drag on a screw, said tubular tangent screw being provided with a cylindrical housing at its outer end communicating with the bore of said tube, said cylindrical housing being threaded on its outer surface, a fulcrum carrying element having a circular flange mounted on the outer end of said cylindrical housing, a coupling sleeve having internal threads threaded into said cylindrical housing and an inturned flange engaging the flange of said fulcrum-carrying element and maintaining such fulcrum-carrying element in fixed relation to said housing, said fulcrum-carrying element being provided with a bore in alignment with the bore of said shaft and housing, a threaded stub shaft threaded into the bore in said fulcrum element, an operating knob on said stub shaft for turning said stub shaft in said fulcrum carrying element, said stub shaft having a rounded projection at its inner end, said fulcrum carrying element having a first fulcrum knife edge at one side of the axis of said bore and a second fulcrum knife edge on the other side of the axis of said bore, a first lever of a size to be received in said housing between said second fulcrum and the opposite side of said housing, said first lever having a fulcrum receiving groove engageable with said first fulcrum, said first lever being adapted to contact the projection on said stub shaft, a second lever of circular disc shape engaging said second fulcrum, said first lever having a third fulcrum on its surface opposite said groove and spaced from said groove toward said second fulcrum and engageable with said second lever whereby rotation of said threaded stub shaft will cause said first lever to pivot about said first fulcrum causing said third fulcrum to move said second lever about said second fulcrum, a rod in said hollow shaft having a conical recess at one end and being rounded at its other end and engageable with said second lever, a toggle pin having conical points at each end positioned in said hollow shaft with one conical point in engagement with the conical recess in said rod and the other conical point adapted for engagement with said movable element between said lugs, movement limiting means effective between said operating knob and said tubular threaded shaft whereby rotation of said operating knob relative to said operating shaft will cause movement of said lever system and said rod and toggle pin relative to said tubular shaft and upon reaching its limiting means will cause rotation of said tubular shaft in said other lug thereby providing for coarse adjustment of said movable element upon turning movement of said tubular shaft in said other lug and providing for fine adjustment by relative rotation of said operating knob with respect to said hollow shaft.

2. A surveying instrument comprising a leveling head, a tubular outer center rotatably mounted in said head, an inner center rotatably mounted in said outer center, said outer center carrying a horizontal circle, said inner center carrying a vernier plate and a telescope, means to secure said outer center in adjusted relation to said leveling head, a vernier plate clamp adjustably secured to said outer center and carrying a projection thereon, means to secure said vernier plate clamp in fixed position with respect to said outer center, a pair of lugs mounted on said vernier plate, said projection of said vernier plate clamp extending between said lugs, spring pressed plunger means in one of said lugs for urging said projection toward the other of said lugs, a tubular shaft exteriorly threaded at one end and in said other lug and axially adjustable toward and away from said one lug, a rod having a rounded end projecting from the other end of said hollow shaft and having a conical recess in its end adjacent said one lug, a double pointed toggle pin in said hollow shaft, with one end engaging said conical recess and the other end projecting beyond the threaded end and engaging said projection, a housing at the outer end of said hollow shaft, a fulcrum member mounted on the end of said housing and having one fulcrum disposed at one side of the axis of said shaft and the other fulcrum on the other side of said shaft and housing, a screw threaded through an aperture in said fulcrum member and having a projection at one end extendable into said housing, an operating knob on the other end of said screw, a first lever pivoted on one fulcrum and engageable with the projection on said knob-operated screw, said first lever being of circular shape, with a segment opposite the fulcrum contacting point cut away for clearance of a second fulcrum, a second lever of circular shape engaging said second fulcrum and engaging a projection on said first lever spaced radially inwardly from said first fulcrum, whereby rotation of said screw by said knob will cause said first lever to move said projection thereon against said second lever causing said second lever to pivot about said second fulcrum and causing said second lever to engage and positively move said rod relative to said hollow shaft thereby positively moving said projection against the bias of said spring pressed plunger, and means to adjust the frictional force between said lug and said hollow threaded shaft.

3. The invention according to claim 2 in which the screw and lever assemblies are used to provide adjustment between the leveling head and said outer center and between the telescope and the standard, whereby accurate adjustment can be rapidly obtained.

4. A surveying instrument comprising a leveling head having a bearing surface therein, a tubular shaft providing an outer center rotatably mounted in said leveling bearing, a horizontal circle mounted on said outer center, an inner center shaft rotatably mounted in said tubular shaft outer center, a vernier plate mounted on said inner center, a vernier scale on said vernier plate closely adjacent the horizontal circle for measuring angles, a lower clamp collar mounted on said outer center, a releasable clamp surrounding said lower clamp collar, a clamp screw for securing said lower clamp on said lower clamp collar, an arm on said lower clamp, an upwardly projecting lug element on said leveling head, a lower clamp tangent screw threaded in the arm of said lower clamp on one side of said lug element, motion reducing means on said screw to reduce axial movement of an element on said screw, a single operating element for said screw and said motion reducing means, lost motion operating means between said single operating element and said screw whereby said operating element will first actuate said motion reducing means and after the lost motion is taken up will operate said screw, a spring pressed plunger mounted on the arm of said lower clamp opposite said tangent screw and normally engaging the projecting lug element on the leveling head whereby adjustment may be obtained between said lower clamp and the leveling head and thereby between the horizontal circle and the leveling head.

5. A screw providing fine and coarse adjustment against a spring-urged member comprising a shaft having a bore therethrough, a rod slidable in the bore of said shaft, said shaft being threaded at one end on its exterior for reception in a threaded aperture for axial movement upon rotation of the shaft, a housing at the other end of said shaft, fulcrum means provided in said housing, lever means in said housing cooperating with said fulcrum means, said lever means having a portion in alignment with said bore for engagement with the rod adapted to be received in the bore of said shaft, and means to move said lever means independently of the rotation of said shaft whereby a rod in said bore may be moved by rotation of said shaft or may be moved independently thereof by operation of said lever means.

6. The invention according to claim 5 in which screw means are provided for operating said lever means, the screw means being of the same pitch as the thread on said shaft.

7. A self-contained screw operated motion reducing lever system comprising a hollow threaded shaft, a cylindrical housing mounted by one of its ends on one end of said hollow threaded shaft, a first and second fulcrum spaced from each other on opposite sides of the axis of said cylindrical housing and mounted on the other end of said housing, a screw threaded into said other end of said housing on which the fulcrums are mounted, a first lever pivotally mounted on one fulcrum and extending adjacent to and spaced from the other fulcrum and extending into contact with said screw, a second lever pivoted on said second fulcrum and extending to adjacent the first fulcrum, a third fulcrum on said first lever adapted to contact said second lever for moving said second lever when said first lever is pivoted upon motion of said screw, and means to transmit motion of said second lever outside of said housing and outside of the other end of said hollow threaded shaft.

8. A self-contained screw operated motion reducing lever system comprising a cylindrical housing, a first and second fulcrum mounted on one end of said housing and spaced on opposite sides of the axis thereof, a screw positioned in alignment with the axis of and threaded into the end of said housing on which the fulcrums are mounted, a first lever of segmental shape pivotally mounted on the first fulcrum and extending adjacent to and spaced from the second fulcrum, a second lever of circular disk shape pivoted on said second fulcrum and extending to adjacent the first fulcrum, a third fulcrum on said first lever adapted to contact said second lever for moving said second lever when said first lever is pivoted by axial movement of said screw, and means to transmit motion of said second lever outside of the housing, the pivotal connection between the levers and the fulcrums being knife edges and the levers being freely movable and separable and being retained in position by the confining action of the cylindrical housing.

9. A screw providing fine and coarse adjustment against a movable member comprising a shaft having a bore therethrough, a rod slidable in said bore said shaft being threaded at one end on its exterior for reception in a threaded aperture for axial movement upon rotation of the shaft, a housing at the other end of said shaft, fulcrum means provided in said housing, lever means in said housing cooperating with said fulcrum means, said lever means having a portion in alignment with said bore for engagement with said rod adapted to be received in the bore of said shaft, and means to move said lever means independently of the rotation of said shaft whereby a rod in said bore may be moved by rotation of said shaft or may be moved independently thereof by operation of said lever means.

10. The invention according to claim 9 in which screw means are provided for operating said lever means, the screw means being of the same pitch as the thread on said shaft.

11. Means to produce coarse and fine adjustments from a single manually engageable handle element comprising a body, a rod-like element mounted on said body for movement relative thereto, a lost motion connection between said handle and said body, linkage means between said handle and said rod-like element for moving said rod-like element upon motion of said handle relative to said body, lost motion connection between said handle and said body whereby initial movement of said handle will not move said body but will move said linkage and said rod-like element relative to said body whereby one adjustment can be made by movement of said body when said handle causes movement of said body and a different rate of movement can be obtained by the operation of said linkage and said rod-like element by movement of said handle relative to said body, thereby providing for two different rates of operation of an element engageable with said rod-like element.

12. Means to produce fine and coarse adjustments comprising an externally threaded shaft, a lug threadedly engaging said shaft, means to adjust the frictional drag between said shaft and said lug, a lever system on said shaft, a screw threadedly and rotatably supported on said shaft for engaging said lever system, a manipulating knob on said screw for causing rotation thereof and thereby operation of said lever system, the frictional drag between said screw operated by said manipulating knob and said shaft being less than the frictional drag between said lug and said threaded shaft whereby rotation of said knob will first cause rotation of the screw connected thereto and operation of said lever system, stop means limiting the rotation of said manipulating knob relative to said hollow threaded shaft so that after engagement of the stop means the hollow shaft will be rotated by said manipulating knob and means extending from the lever system beyond said threaded shaft for engaging the element to be moved.

13. A device for causing motion at two different rates comprising a hollow threaded shaft, a member having an internally threaded bore engaging the threads of said shaft, a screw carrying element mounted on said shaft and having a threaded bore substantially in alignment with the threaded shaft, a stub shaft threaded in said threaded bore of said screw carrying element, operating means connected to said threaded stub shaft for causing axial movement thereof relative to said hollow threaded shaft, connecting link means between said threaded stub shaft and the exterior of said hollow shaft for carrying motion of the screw stub shaft beyond said hollow shaft, said stub shaft being more freely rotatable in its threaded bore than the hollow shaft in the member having an internally threaded bore engaging the threads of said hollow threaded shaft whereby operation of said stub shaft operating means first causes rotation of said stub shaft and thereby of the connecting link means, stop means limiting the rotation of said operating means relative to said hollow shaft, whereby after a predetermined rotation of said stub shaft said hollow shaft will be rotated in the same direction and cause movement in the same direction as the rotation of said threaded stub shaft, whereby a fine and coarse adjustment can be obtained by a single operating means.

14. A device for causing motion at two different rates comprising a hollow threaded shaft, a member having an internally threaded bore engaging the threads of said shaft, a screw carrying element mounted on said shaft and having a threaded bore substantially in alignment with the threaded shaft, a stub shaft threaded in said threaded bore of said screw carrying element, operating means connected to said threaded stub shaft for causing axial movement thereof relative to said hollow threaded shaft, connecting link means between said threaded stub shaft and the exterior of said hollow shaft for carrying motion of the screw stub shaft beyond said hollow shaft, said stub shaft being more freely rotatable in its threaded bore than the hollow shaft in the member having an internally threaded bore engaging the threads of said hollow threaded shaft whereby operation of said stub shaft operating means first causes rotation of said stub shaft and thereby of the connecting link means, stop means limiting the rotation of said operating means relative to said hollow shaft, whereby after a predetermined rotation of said stub shaft said hollow shaft will be rotated and cause movement, whereby a fine and coarse adjustment can be obtained by a single operating means.

References Cited in the file of this patent

UNITED STATES PATENTS

| | | |
|---|---|---|
| 2,132,170 | Langsner | Oct. 4, 1938 |
| 2,257,400 | Ray | Sept. 30, 1941 |
| 2,338,271 | Ulanet | Jan. 4, 1944 |
| 2,645,972 | Aitcheson | July 21, 1953 |

FOREIGN PATENTS

| | | |
|---|---|---|
| 591,332 | Germany | Jan. 19, 1934 |
| 48,787 | France | Mar. 18, 1938 |